(12) United States Patent
Narayanam et al.

(10) Patent No.: US 11,068,943 B2
(45) Date of Patent: Jul. 20, 2021

(54) GENERATING COLLABORATIVE ORDERINGS OF INFORMATION PERTAINING TO PRODUCTS TO PRESENT TO TARGET USERS

(71) Applicant: International Business Machines Corporation, Armonk, NY (US)

(72) Inventors: Ramasuri Narayanam, Bangalore (IN); Srikanth Govindaraj Tamilselvam, Bangalore (IN); Sameep Mehta, New Delhi (IN); Gyana Ranjan Parija, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 115 days.

(21) Appl. No.: 16/167,703

(22) Filed: Oct. 23, 2018

(65) Prior Publication Data

US 2020/0126127 A1  Apr. 23, 2020

(51) Int. Cl.
*G06Q 30/00* (2012.01)
*G06Q 30/02* (2012.01)
(Continued)

(52) U.S. Cl.
CPC ......... *G06Q 30/0271* (2013.01); *G06F 9/547* (2013.01); *G06Q 30/0251* (2013.01); *G06Q 30/0276* (2013.01); *G10L 15/02* (2013.01)

(58) Field of Classification Search
CPC .... G06Q 30/0207–0277; G06N 99/005; G06F 9/547
See application file for complete search history.

(56) References Cited

U.S. PATENT DOCUMENTS 6,757,362 B1 * 6/2004 Cooper ................. H04M 3/527
                                                                    379/88.01
7,188,106 B2   3/2007 Dwork et al.
(Continued)

FOREIGN PATENT DOCUMENTS

CN      105260746 A    1/2016
CN      107210035 A    9/2017
WO      2018077401 A1  5/2018

OTHER PUBLICATIONS

Craig, Paul., et al. "A Vertical Timeline Visualization for the Exploratory Analysis of Dialogue Data." Edinburgh Napier University, 2015. (Year: 2015).*

(Continued)

*Primary Examiner* — Luis A Brown
(74) *Attorney, Agent, or Firm* — Ryan, Mason & Lewis, LLP (57) ABSTRACT

Methods, systems, and computer program products for generating collaborative orderings of information pertaining to products to present to target users are provided herein. A computer-implemented method includes generating, for each of multiple target users, a personalized initial ordering of multiple statements pertaining to an entity by analyzing the statements and user-specific information; calculating, for each of the target users, a utility score that comprises (i) similarity between a consensus ordering of the statements and the given target user's personalized initial ordering of the statements, and (ii) similarity between the other target users' personalized initial orderings of the statements; generating a final ordering of the statements by enabling, based on the calculated utility scores, agents representing the target users to exchange revised orderings of the multiple state- (Continued)

ments via one or more automated communication iterations; and outputting the statements, in the final ordering, to the target users.

18 Claims, 7 Drawing Sheets

(51) Int. Cl.
  *G06F 9/54* (2006.01)
  *G10L 15/02* (2006.01)

(56) References Cited

U.S. PATENT DOCUMENTS

| | | | |
|---|---|---|---|
| 7,840,522 | B2 | 11/2010 | Liv et al. |
| 7,958,126 | B2 | 6/2011 | Schachter |
| 7,979,314 | B2 | 7/2011 | Ulenas |
| 8,150,860 | B1 | 4/2012 | Cierniak et al. |
| 8,412,717 | B2 | 4/2013 | Liao et al. |
| 9,576,292 | B2 | 2/2017 | Freishtat et al. |
| 2005/0262050 | A1 | 11/2005 | Fagin et al. |
| 2010/0235218 | A1 | 9/2010 | Erhart et al. |
| 2013/0077767 | A1* | 3/2013 | Suendermann ..... H04M 3/4936 379/88.01 |
| 2014/0279802 | A1 | 9/2014 | Harrington et al. |
| 2015/0039548 | A1 | 2/2015 | Mills et al. |
| 2016/0217128 | A1* | 7/2016 | Baum ................... G06F 40/284 |
| 2016/0320956 | A9 | 11/2016 | Rosenberg |
| 2018/0053210 | A1* | 2/2018 | Modarresi .......... G06Q 30/0251 |
| 2018/0121766 | A1* | 5/2018 | McCord .............. G06K 9/6297 |
| 2018/0293103 | A1* | 10/2018 | Kalmus .................... G06N 5/02 |
| 2019/0058793 | A1* | 2/2019 | Konig ................. H04M 3/5183 |
| 2019/0095804 | A1* | 3/2019 | Mukherjea ............. G06N 5/043 |
| 2019/0318004 | A1* | 10/2019 | Rohatgi ................... G06F 40/30 |
| 2019/0318219 | A1* | 10/2019 | Arora ..................... G06N 3/006 |
| 2020/0005117 | A1* | 1/2020 | Yuan ....................... G06N 3/006 |
| 2020/0074350 | A1* | 3/2020 | Pimplikar .............. G06N 3/006 |
| 2020/0074366 | A1* | 3/2020 | Narayanam ...... G06Q 10/06313 |
| 2020/0126127 | A1* | 4/2020 | Narayanam ........ G06Q 30/0276 |

OTHER PUBLICATIONS

Vaasen, Frederik, et al. "Automatic Emotion Classification for Interpersonal Communication." CliPS, University of Antwerp, 2015. (Year: 2015).*

Spectre, Rob. "Using Natural Language Processing for Better SMS Interfaces Using Twilio and Python's TextBlob." Twilio Blog, twilio.com, Jun. 2014. (Year: 2014).*

Van Kleek, Max, et al. "Social Personal Data Stores: The Nuclei of Decentralised Social Machines." International World Wide Web Confewremce Committee, Florence, 2015. (Year: 2015).*

Papapanagiotou, Petros, et al. "Social Machines for All." AAAMAS, Stockholm, Jul. 2018. (Year: 2018).*

McRorie, Margaret, et al. "Evaluation of Four Designed Virtual Agent Personalities." IEEE Transactions of Effective Computing, vol. 3, No. 3, Jul.-Sep. 2012. (Year: 2012).*

O'Brien, P.D., et al. "FIPA-Towards a Standard for Software Agents." BT Technological Journal, vol. 16, No. 3, Jul. 1998. (Year: 1998).*

Yu, P., Collaborative Filtering Recommendation Algorithm Based on Both User and Item, Computer Science and Network Technology (ICCSNT), 2015 4th International Conference.

Fagin et al., Efficient similarity search and classification via rank aggregation. SIGMOD Conference 2003: 301-312.

Fagin et al., Comparing and Aggregating Rankings with Ties. PODS 2004: 47-58.

Dwork et al., Rank aggregation methods for the Web. WWW 2001: 613-622.

Van Zuylen et al., Deterministic Algorithms for Rank Aggregation and Other Ranking and Clustering Problems. WAOA 2007: 260-273.

Macdonald et al., Learning Models for Ranking Aggregates. ECIR 2011: 517-529.

\* cited by examiner

GENERATING COLLABORATIVE ORDERINGS OF INFORMATION PERTAINING TO PRODUCTS TO PRESENT TO TARGET USERS

FIELD

The present application generally relates to information technology and, more particularly, to processing data.

BACKGROUND

Businesses and other enterprises commonly attempt to reach users (such as customers) through multiple touchpoints. Notwithstanding, excelling with respect to a single touchpoint can often provide a competitive advantage. However, challenges exist in successfully engaging users through touchpoints, for example, in a context of addressing more than one user at the same time.

SUMMARY

In one embodiment of the present invention, techniques for generating collaborative orderings of information pertaining to products to present to target users are provided. An exemplary computer-implemented method can include generating, for each of multiple target users, a personalized initial ordering of multiple statements pertaining to at least one entity by analyzing (i) the multiple statements and (ii) user-specific information. Such a method also includes calculating, for each of the multiple target users, a utility score that comprises (i) a first value representing similarity between a consensus ordering of the multiple statements and the given target user's personalized initial ordering of the multiple statements, and (ii) a second value representing similarity between the other target users' personalized initial orderings of the multiple statements. Additionally, such a method includes generating a final ordering of the multiple statements by enabling, based at least in part on the calculated utility scores, agents representing the multiple target users to exchange revised orderings of the multiple statements via one or more automated communication iterations, and outputting the multiple statements, in the generated final ordering, to the multiple target users.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes generating collaborative consensus rank orderings of information pertaining to products to present simultaneously to target users. Given a set of target users having a possibly diverse set of profiles and constraints, a product or service, and a set of statements pertaining to the product or service, at least one embodiment of the invention includes generating a collaborative consensus rank ordering of the statements in order to present (simultaneously) the statements to the set of target users. Such statements can be derived, for example, from the manufacturer of the given product, and can pertain to aspects such as key features of the product, add-on features of the product, a warranty period, security features, product support and service timeline, total price of the product, volume discounts if multiple numbers of the same product are purchased, etc.

Such an embodiment can include using a framework of multi-agent(s) collaboration to perform a combined analysis of the statements and the user profiles and constraints to generate personalized initial rank orderings of the statements for each of the target users. One or more embodiments of the invention can also include calculating and/or representing how close a consensus rank ordering of the statements of each target user's agent is from its own rank ordering of statements, and calculating and/or representing how close the rank orderings of facts of the other agents are from reaching the consensus ordering. For example, in at least one embodiment of the invention, a set of rank orders is in consensus if the relative ordering of the items/statements is the same in each of the rank orders. Further, such an embodiment can additionally include enabling and/or allowing multiple agent interactions wherein the agents share their orderings of the statements with each other so as to reach a consensus ordering, as well as determining a revised ordering of the statements that satisfies one or more user-defined fairness criteria upon failing to reach a consensus.

By way merely of illustration, consider an example use case involving a product and a set of statements about this product. Assume that a sales person is trying to sell the product to multiple different chief experience officers (CXOs) at the same time. These different CXOs have different profiles, preferences and constraints (as they belong to different organizations). Further assume, for example, that for efficient business outcomes, it is required to generate a personalized ordering of the set of statements about the product for a given profile of a particular CXO. However, because the current business scenario requires the sales person to sell the product to multiple different CXOs at the same time, it is an extremely challenging problem to derive a rank ordering of the set of statements that best suits different CXOs simultaneously. Accordingly, as further detailed herein, at least one embodiment of the invention includes determining a single consensus ordering of facts about an entity (such as a product or service) that is fair across a diverse collection of user profiles and constraints.

Figure 1:
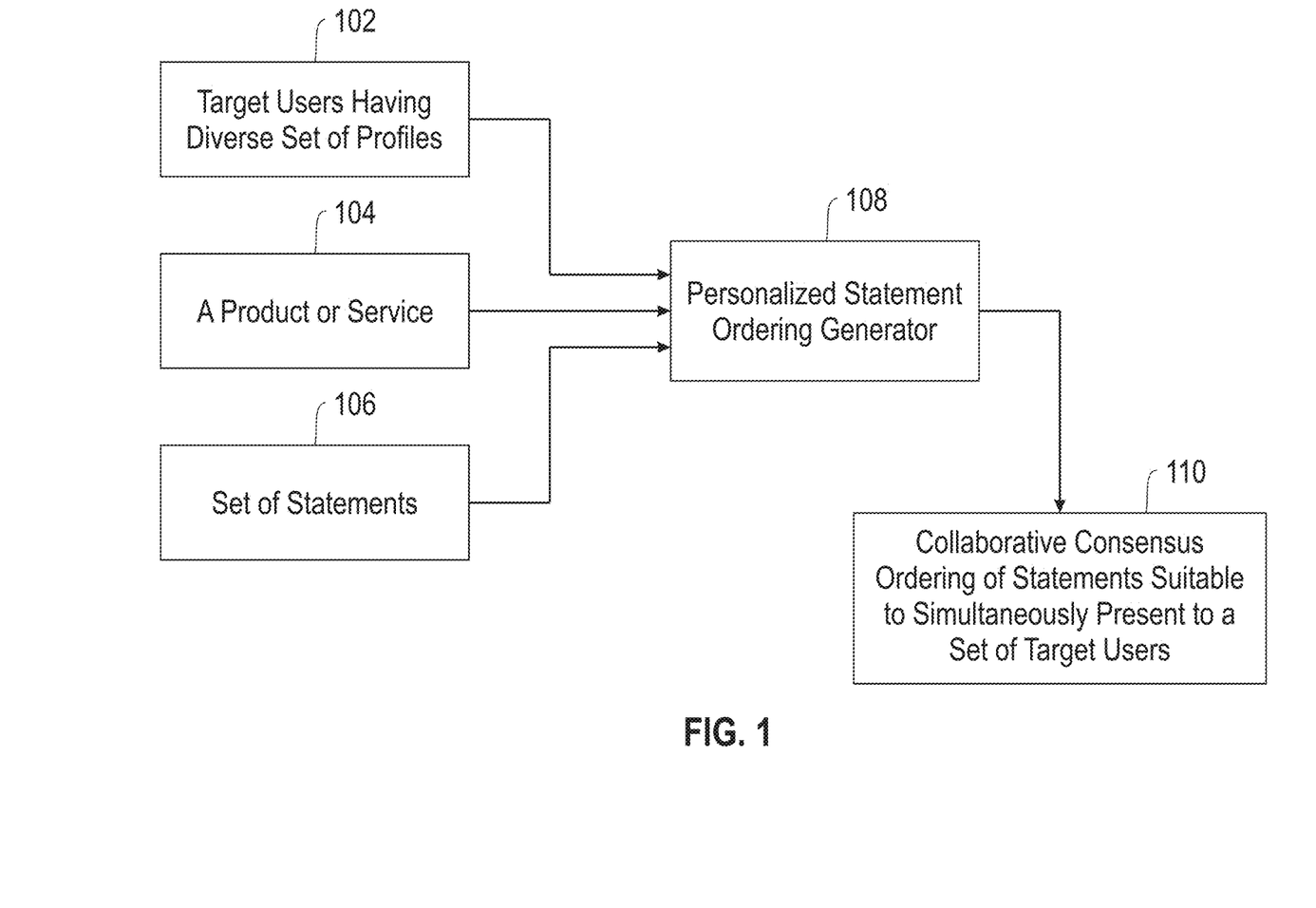
FIG. 1 is a diagram illustrating system architecture, according to an exemplary embodiment of the invention.

FIG. 1 is a diagram illustrating system architecture, according to an embodiment of the invention. By way of illustration, FIG. 1 depicts a personalized statement ordering generator 108, which takes, as input, target users 102 having diverse profiles/information, a given product or service 104, and a set of statements 106 pertaining to the product or service. The personalized statement ordering generator 108 processes these inputs and generates an output in the form of a collaborative consensus ordering of statements 110 suitable to simultaneously present to the target users 102.

In at least one embodiment of the invention, the personalized statement ordering generator 108 can generate a personalized rank ordering of statements for each target user. By considering and/or analyzing the set of statements 106 as well as the profiles and/or constraints of the target users 102, the personalized statement ordering generator 108 can derive a rank ordering of the set of statements 106 by performing sentiment analysis and/or text analytics on the set of statements 106 as well as the profiles and/or constraints of the target users 102. By analyzing the profiles of the target user and the company to which this user belongs, one or more embodiments of the invention can include deriving topics and/or aspects in which the target user is more focused when it comes to statements pertaining the product. According to these topics/aspects of interest to the target user, such an embodiment can include determining a personalized ordering of statements.

Additionally, one or more embodiments of the invention include generating a consensus ordering of statements about an entity (such as a product or service). Such an embodiment can include utilizing players, strategies, and utility components. With respect to players, for example, let n represent the number of software agents (which can be the same as the number of target users). The strategies can include a list of preferences over the statements of the entity, wherein it is assumed that there are m statements. With respect to utility components, each player can have a private utility component and a public utility component, and each agent can have its own preference over the statements. In an example embodiment of the invention, let $\{p_1, p_2, \ldots, p_n\}$ be the set of preferences of the agents (also referred to herein as ground-truth preferences).

An agent's private utility component can be the maximum amount/value if the agent's preference is the same as the consensus outcome; otherwise, the agent's private utility component must result in a smaller quantity. The public utility component of each agent can be the maximum amount/value when all of the agents reach the consensus; otherwise, this component must result in a smaller quantity.

In one or more embodiments of the invention, the utility function of any agent is defined as follows:

utility function=

$$U_i(s_1, s_2, \ldots, s_n) = \left\{ \binom{m}{2} - d\{s_i, p_i\} \right\} + \left\{ \sum_{j,k \in N} sim(s_j, s_k) \right\}.$$

The first term is referred to herein as the private utility component and the second term is referred to herein as the public utility component. Because the preferences are rank orders, the similarity scores can be calculated using the Kendal-Tau distance measure. For instance, consider two rank orders: (i) a, d, c, b and (ii) d, a, b, c. Now, following a Kendal Tau distance measure, the similarity between these two preference orders is defined as the number of pairs with agreement in both preference orders. A pair of symbols is identified as in agreement in both preference orders if the symbols appear in the same order in both preference orders. Following such definitions, the set of pairs of symbols in the same order in both of the above example preference orders={(a, c), (a, b), (d, c), (d, b)}. Hence, the similarity between the above two example preference orders is 4.

As also detailed herein, at least one embodiment of the invention can include implementing a structure of repeated interaction among agents. By way of example, consider a use case wherein in Round 1, each agent announces its ground-truth preference and/or internal preference as a strategy. Then, each agent computes private and public utility components based thereon. If all of the agents report the same preference as the strategy, then the game ends. Otherwise, the game proceeds for one or more additional rounds until a consensus emerges.

At least one embodiment of the invention can also include implementing one or more fairness criteria for preference updating. By way merely of example, fairness criteria can include a revised preference of an agent representing a compromise between the persistent value of its own internal preference and the expressed preferences of other agents. In one or more embodiments of the invention, it is possible that fairness criteria can be decided by an enterprise owning the product or service in question, by taking into account multiple factors such as the profiles of the target audience, its own business constraints, etc.

Figure 2:
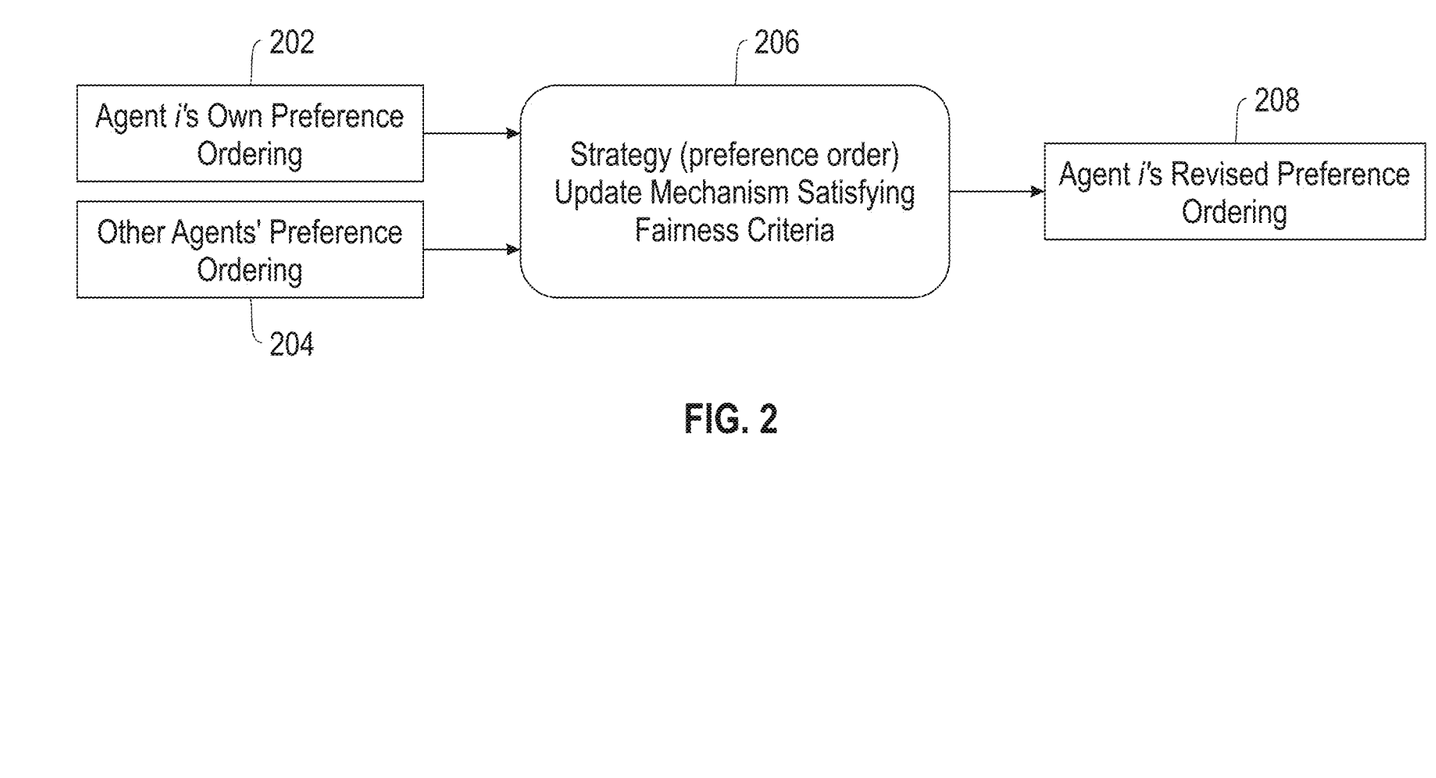
FIG. 2 is a diagram illustrating consensus rank ordering of statements about an entity, according to an exemplary embodiment of the invention.

FIG. 2 is a diagram illustrating consensus rank ordering of statements about an entity, according to an exemplary embodiment of the invention. By way of illustration, FIG. 2 depicts a strategy (preference order) update mechanism 206, which satisfies one or more fairness criteria, and which takes as input agent i's own preference ordering 202 and other agents' preference ordering 204, and generates an output in the form of agent i's revised preference ordering 208.

In one or more embodiments of the invention, players (also referred to herein as agents and/or target users) are connected to each other (that is, the players form a complete graph of communication). In such an embodiment, let $s_i$ be the initially preference agent i, let $z_i$ be the revised preference of agent i, and let computing a revised preference of agent i be represented as follows:

$$z_i = \frac{s_i + \sum_{j \neq i} z_j}{1 + \text{Number of Neighbors of Agent } i}$$

wherein the "+" sign can be defined appropriately. For example, the "+" sign in the above equation can be defined as the sum of positions of each entry in the rank orderings.

Figure 3:
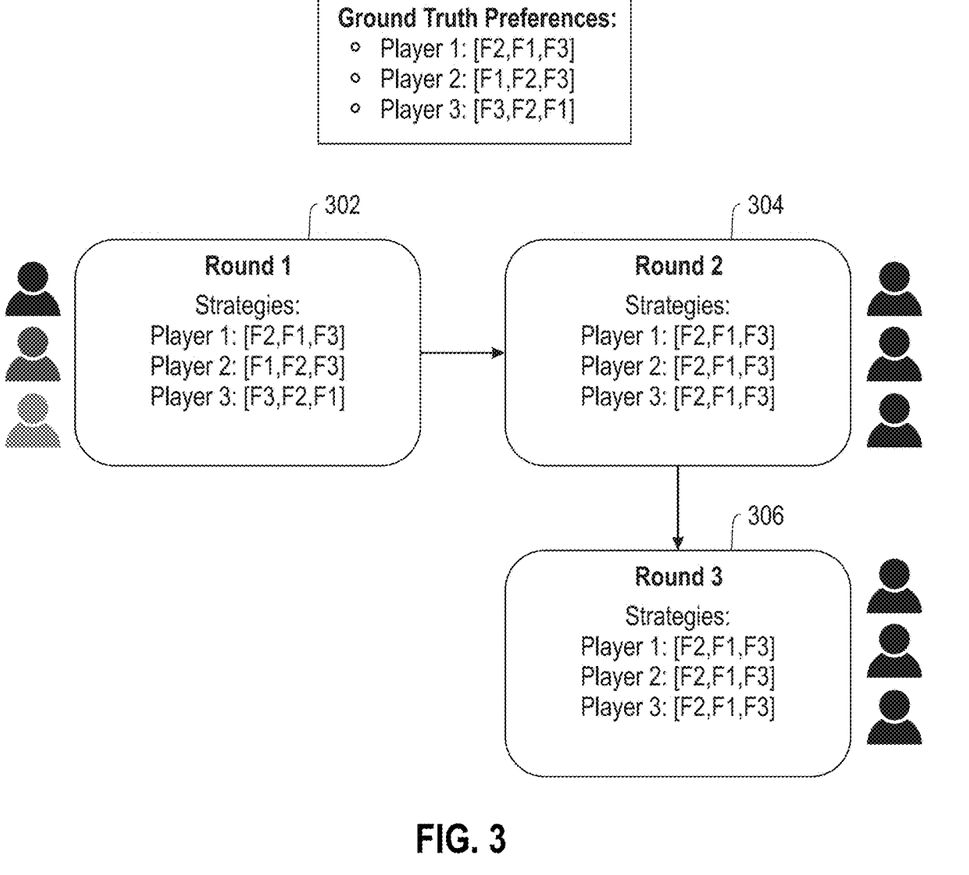
FIG. 3 is a diagram illustrating implementation of a strategy update rule, according to an exemplary embodiment of the invention.

FIG. 3 is a diagram illustrating implementation of a strategy update rule, according to an exemplary embodiment of the invention. By way of illustration, FIG. 3 depicts a first round of communication 302 among the target users and/or agents, a second round of communication 304 among the target users and/or agents, and a third round of communication 306 among the target users and/or agents. FIG. 3 is an illustration of an example embodiment of the invention wherein F1, F2 and F3 are fact statements about a product. In the first round of communication 302, each user/agent comes up with his or her own preference ordering of the statements. Accordingly, as depicted in FIG. 3, the ground truth preferences for Player 1 include [F2, F1, F3], the ground truth preferences for Player 2 include [F1, F2, F3], and the ground truth preferences for Player 3 include [F3, F2, F1]. Additionally, in the subsequent rounds of communication (304 and 306), these agents update their preference orderings in such a way that they all reach a consensus wherein the preference orders of all of the agents are the same.

Figure 4:
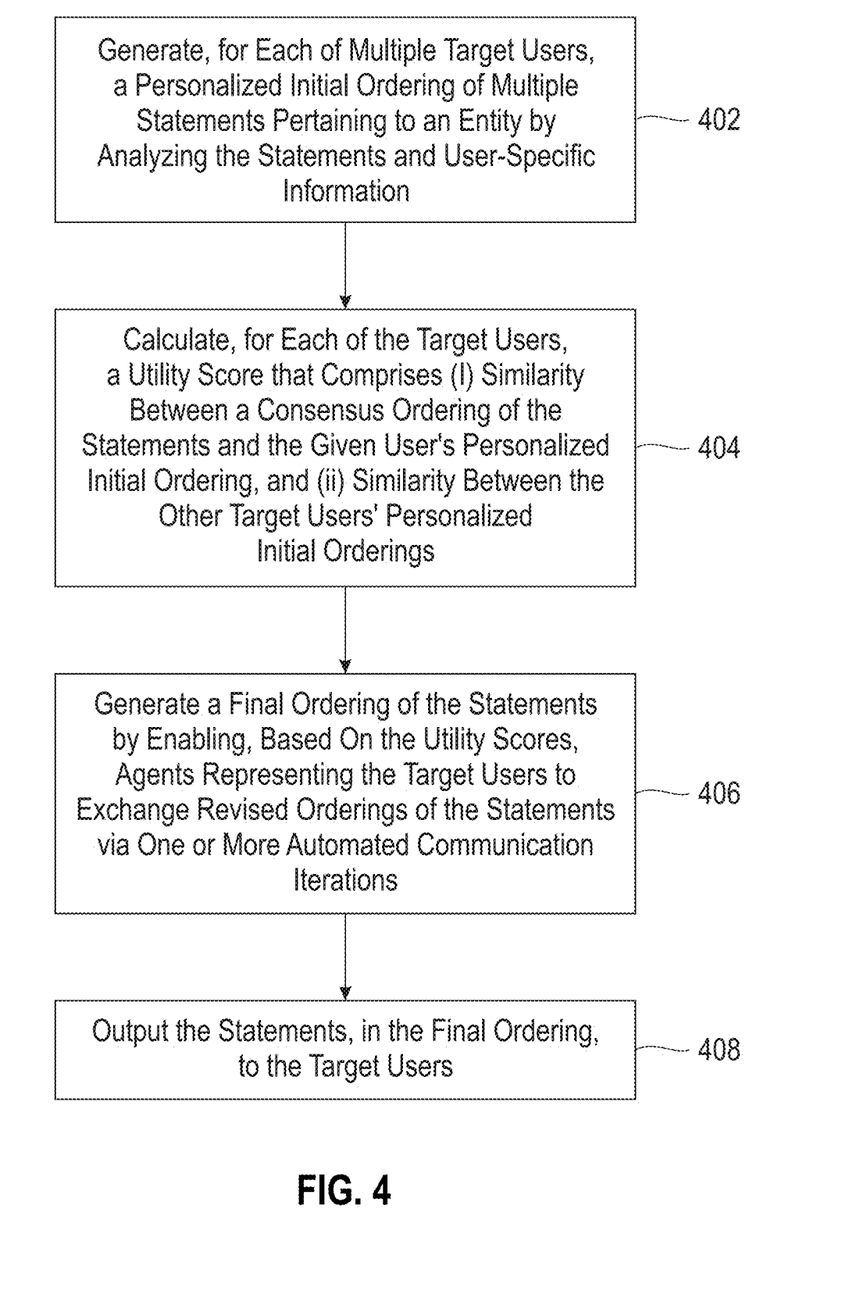
FIG. 4 is a flow diagram illustrating techniques according to an embodiment of the invention.

FIG. 4 is a flow diagram illustrating techniques according to an embodiment of the present invention. Step 402 includes generating, for each of multiple target users, a personalized initial ordering of multiple statements pertaining to at least one entity by analyzing (i) the multiple statements and (ii) user-specific information. The at least one entity can include at least one product and/or at least one service. Also, the user-specific information can include one or more user-specific preferences and/or one or more user-specific constraints.

Further, in at least one embodiment of the invention, analyzing can include performing sentiment analysis of (i) the multiple statements and (ii) the user-specific information. Also, in one or more embodiments of the invention, analyzing can include performing text analytics on (i) the multiple statements and (ii) the user-specific information.

Step 404 includes calculating, for each of the multiple target users, a utility score that comprises (i) a first value representing similarity between a consensus ordering of the multiple statements and the given target user's personalized initial ordering of the multiple statements, and (ii) a second value representing similarity between the other target users' personalized initial orderings of the multiple statements.

Step 406 includes generating a final ordering of the multiple statements by enabling, based at least in part on the calculated utility scores, agents representing the multiple target users to exchange revised orderings of the multiple statements via one or more automated communication iterations. In at least one embodiment of the invention, the agents can include software agents. Also, the revised orderings of the multiple statements can include revised orderings of the multiple statements that satisfy one or more user-defined fairness criteria. Examples of user-defined fairness criteria can include criteria such as "the revised ordering can be the average of the orderings of the other agents," and "the revised ordering should give some weight to its own ordering and also some weight to the orderings of the other agents."

Step 408 includes outputting the multiple statements, in the generated final ordering, to the multiple target users. In at least one embodiment of the invention, outputting can include simultaneously outputting the multiple statements, in the generated ordering, to the group of target users.

Alternatively, one or more embodiments of the invention can include generating, for each of multiple target users, a personalized initial ordering of multiple statements pertaining to a product by analyzing (i) the multiple statements, (ii) one or more user-specific preferences, and (iii) one or more user-specific constraints. Such an embodiment can also include calculating, for each of the multiple target users, a utility score that comprises (i) a first value representing similarity between a pre-determined ordering of the multiple statements and the given target user's personalized initial ordering of the multiple statements, and (ii) a second value representing similarity between the other target users' personalized initial orderings of the multiple statements. Further, such an embodiment can additionally include generating a final ordering of the multiple statements by enabling, based at least in part on the calculated utility scores, agents representing the multiple target users to exchange revised orderings of the multiple statements via one or more automated communication iterations, wherein the revised orderings of the multiple statements comprise revised orderings that satisfy one or more user-defined fairness criteria, and displaying the multiple statements, in the generated final ordering, to the multiple target users via one or more user interfaces.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 5:
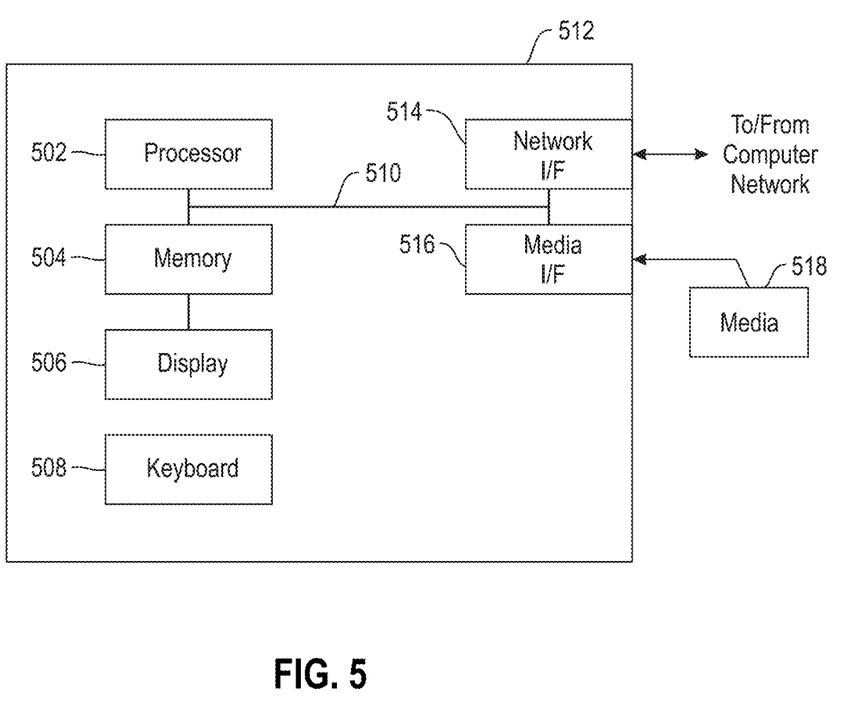
FIG. 5 is a system diagram of an exemplary computer system on which at least one embodiment of the invention can be implemented.

Additionally, an embodiment of the present invention can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
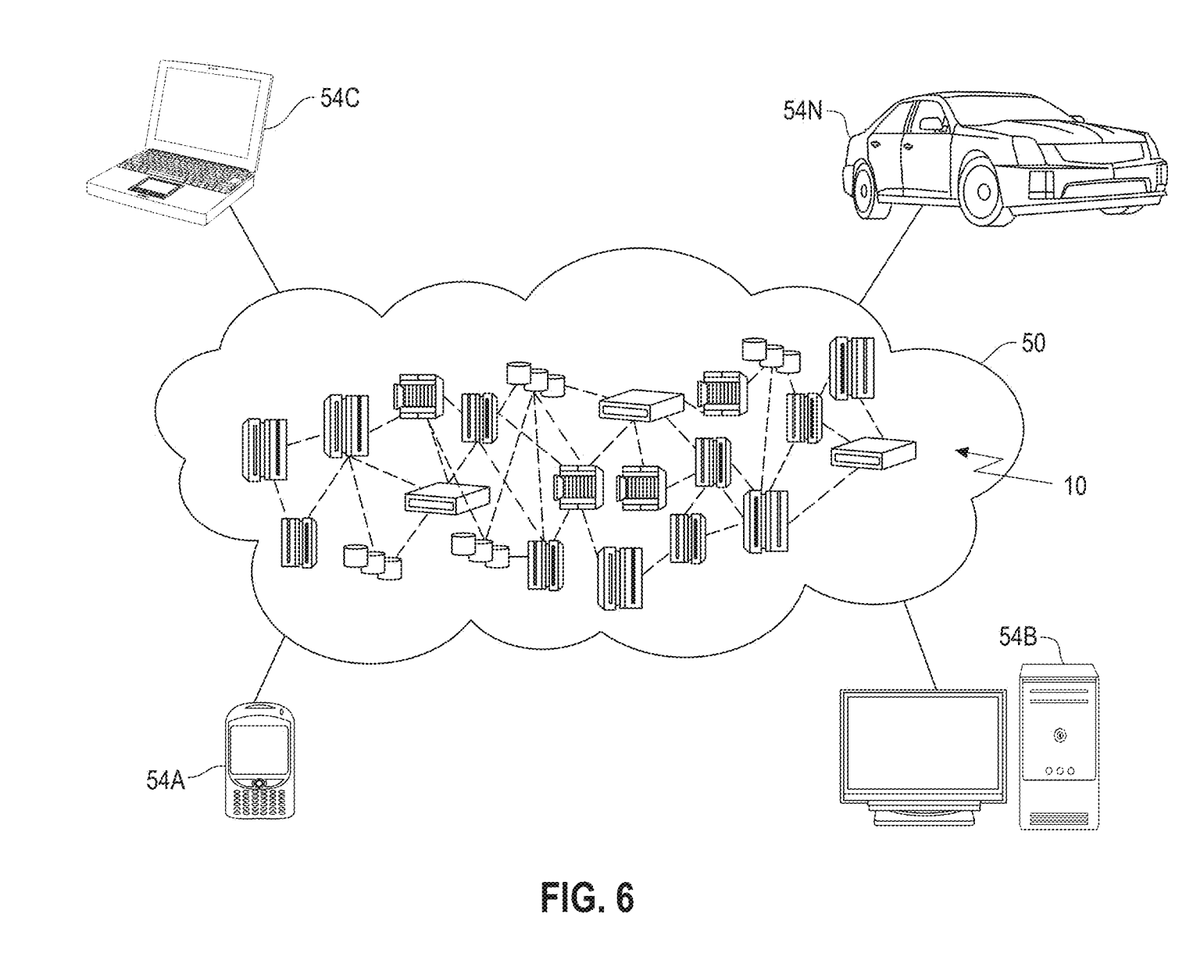
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
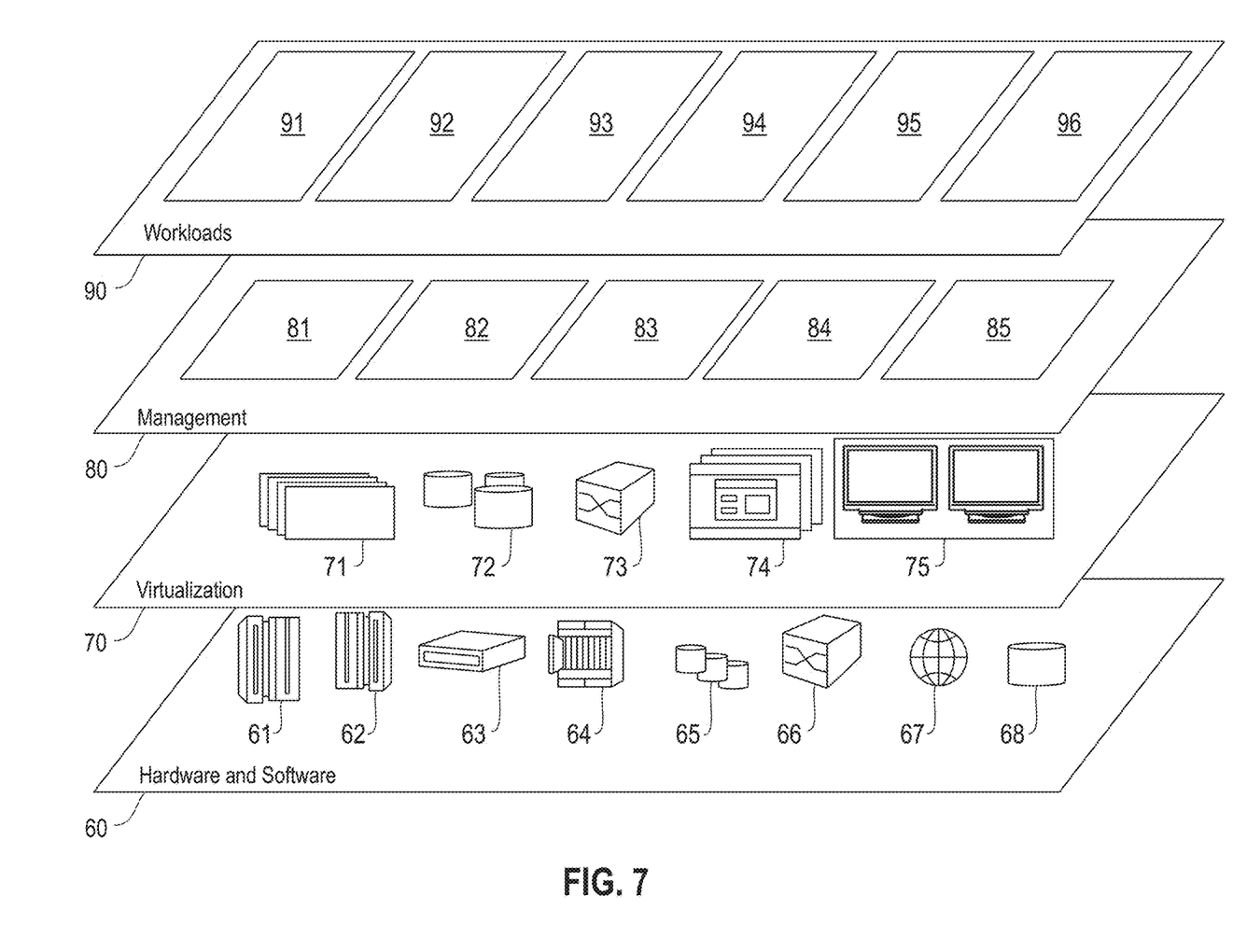
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and statement ordering generation 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, generating a collaborative consensus rank ordering of product-related statements to present simultaneously to a group of target users.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
generating at least one thin client interface configured for interactive collaborative analysis of statements and user-specific information across multiple client devices associated with multiple target users;
generating, for each of the multiple target users, a personalized initial ordering of multiple statements pertaining to at least one entity by analyzing (i) the multiple statements and (ii) user-specific information;

calculating, for each of the multiple target users, a utility score that comprises (i) a first value representing similarity between a consensus ordering of the multiple statements and the given target user's personalized initial ordering of the multiple statements, and (ii) a second value representing similarity between the other target users' personalized initial orderings of the multiple statements;

creating a framework of multiple automated software agents representative of the multiple target users, wherein creating the framework of multiple automated software agents comprises configuring each of the automated software agents to compute outputs representing compromises between internal ordering preferences of the given automated software agent and expressed ordering preferences of other automated software agents;

generating a final ordering of the multiple statements, based at least in part on the calculated utility scores, using the framework of multiple automated software agents and exchanging revised orderings of the multiple statements via one or more automated communication iterations; and outputting the multiple statements, in the generated final ordering, to the multiple client devices via the at least one thin client interface;

wherein the method is carried out by at least one computing device.

2. The computer-implemented method of claim 1, wherein the at least one entity comprises at least one product.

3. The computer-implemented method of claim 1, wherein the at least one entity comprises at least one service.

4. The computer-implemented method of claim 1, wherein the user-specific information comprises one or more user-specific preferences.

5. The computer-implemented method of claim 1, wherein the user-specific information comprises one or more user-specific constraints.

6. The computer-implemented method of claim 1, wherein said analyzing comprises performing sentiment analysis of (i) the multiple statements and (ii) the user-specific information.

7. The computer-implemented method of claim 1, wherein said analyzing comprises performing text analytics on (i) the multiple statements and (ii) the user-specific information.

8. The computer-implemented method of claim 1, wherein the revised orderings of the multiple statements comprise revised orderings of the multiple statements that satisfy one or more user-defined fairness criteria.

9. The computer-implemented method of claim 1, wherein said outputting comprises simultaneously outputting the multiple statements, in the generated ordering, to the client devices.

10. A computer program product comprising a non-transitory computer readable storage medium having program instructions embodied therewith, the program instructions executable by a computing device to cause the computing device to:

generate at least one thin client interface configured for interactive collaborative analysis of statements and user-specific information across multiple client devices associated with multiple target users;

generate, for each of the multiple target users, a personalized initial ordering of multiple statements pertaining to at least one entity by analyzing (i) the multiple statements and (ii) user-specific information;

calculate, for each of the multiple target users, a utility score that comprises (i) a first value representing similarity between a consensus ordering of the multiple statements and the given target user's personalized initial ordering of the multiple statements, and (ii) a second value representing similarity between the other target users' personalized initial orderings of the multiple statements;

create a framework of multiple automated software agents representative of the multiple target users, wherein creating the framework of multiple automated software agents comprises configuring each of the automated software agents to compute outputs representing compromises between internal ordering preferences of the given automated software agent and expressed ordering preferences of other automated software agents;

generate a final ordering of the multiple statements, based at least in part on the calculated utility scores, using the framework of multiple automated software agents and exchanging revised orderings of the multiple statements via one or more automated communication iterations; and output the multiple statements, in the generated final ordering, to the multiple client devices via the at least one thin client interface.

11. The computer program product of claim 10, wherein said analyzing comprises performing sentiment analysis of (i) the multiple statements and (ii) the user-specific information.

12. The computer program product of claim 10, wherein said analyzing comprises performing text analytics on (i) the multiple statements and (ii) the user-specific information.

13. The computer program product of claim 10, wherein the revised orderings of the multiple statements comprise revised orderings of the multiple statements that satisfy one or more user-defined fairness criteria.

14. A system comprising:
a memory; and
at least one processor operably coupled to the memory and configured for:

generating at least one thin client interface configured for interactive collaborative analysis of statements and user-specific information across multiple client devices associated with multiple target users;

generating, for each of the multiple target users, a personalized initial ordering of multiple statements pertaining to at least one entity by analyzing (i) the multiple statements and (ii) user-specific information;

calculating, for each of the multiple target users, a utility score that comprises (i) a first value representing similarity between a consensus ordering of the multiple statements and the given target user's personalized initial ordering of the multiple statements, and (ii) a second value representing similarity between the other target users' personalized initial orderings of the multiple statements;

creating a framework of multiple automated software agents representative of the multiple target users, wherein creating the framework of multiple automated software agents comprises configuring each of the automated software agents to compute outputs representing compromises between internal ordering preferences of the given automated software agent and expressed ordering preferences of other automated software agents;

generating a final ordering of the multiple statements, based at least in part on the calculated utility scores, using the framework of multiple automated software agents and exchanging revised orderings of the multiple statements via one or more automated communication iterations; and outputting the multiple statements, in the generated final ordering, to the multiple client devices via the at least one thin client interface.

15. The system of claim 14, wherein said analyzing comprises performing sentiment analysis of (i) the multiple statements and (ii) the user-specific information.

16. The system of claim 14, wherein said analyzing comprises performing text analytics on (i) the multiple statements and (ii) the user-specific information.

17. The system of claim 14, wherein the revised orderings of the multiple statements comprise revised orderings of the multiple statements that satisfy one or more user-defined fairness criteria.

18. A computer-implemented method comprising:

generating one or more thin client interfaces configured for interactive collaborative analysis of statements and user-specific information across multiple client devices associated with multiple target users;

generating, for each of the multiple target users, a personalized initial ordering of multiple statements pertaining to a product by analyzing (i) the multiple statements, (ii) one or more user-specific preferences, and (iii) one or more user-specific constraints;

calculating, for each of the multiple target users, a utility score that comprises (i) a first value representing similarity between a pre-determined ordering of the multiple statements and the given target user's personalized initial ordering of the multiple statements, and (ii) a second value representing similarity between the other target users' personalized initial orderings of the multiple statements;

creating a framework of multiple automated software agents representative of the multiple target users, wherein creating the framework of multiple automated software agents comprises configuring each of the automated software agents to compute outputs representing compromises between internal ordering preferences of the given automated software agent and expressed ordering preferences of other automated software agents;

generating a final ordering of the multiple statements, based at least in part on the calculated utility scores, using the framework of multiple automated software agents and exchanging revised orderings of the multiple statements via one or more automated communication iterations, wherein the revised orderings of the multiple statements comprise revised orderings that satisfy one or more user-defined fairness criteria; and displaying the multiple statements, in the generated final ordering, to the multiple client devices via the one or more user thin client interfaces;

wherein the method is carried out by at least one computing device.

* * * * *